No. 685,283.  
J. W. KOHLHEPP.  
HOG SCRAPING MACHINE.  
(Application filed June 4, 1897.)  
Patented Oct. 29, 1901.
(No Model.)
2 Sheets—Sheet 1.
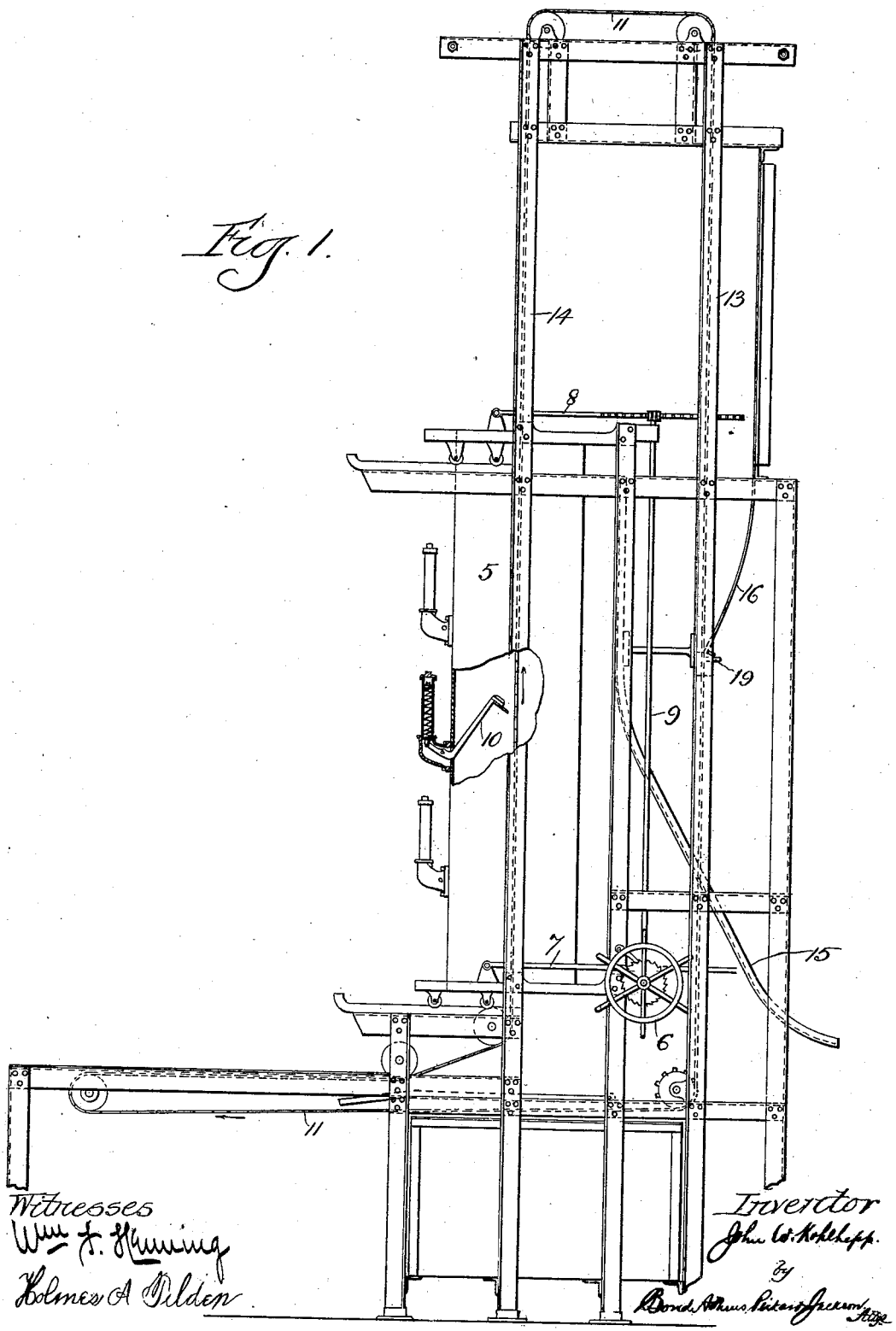

No. 685,283. Patented Oct. 29, 1901.
J. W. KOHLHEPP.
HOG SCRAPING MACHINE.
(Application filed June 4, 1897.)
(No Model.) 2 Sheets—Sheet 2.
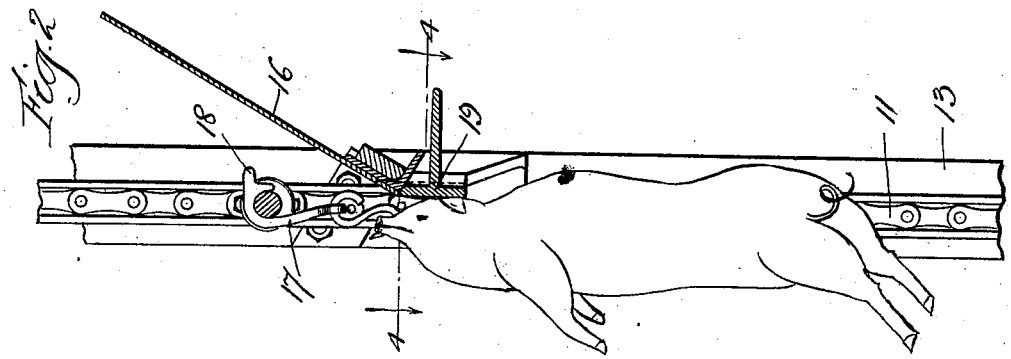
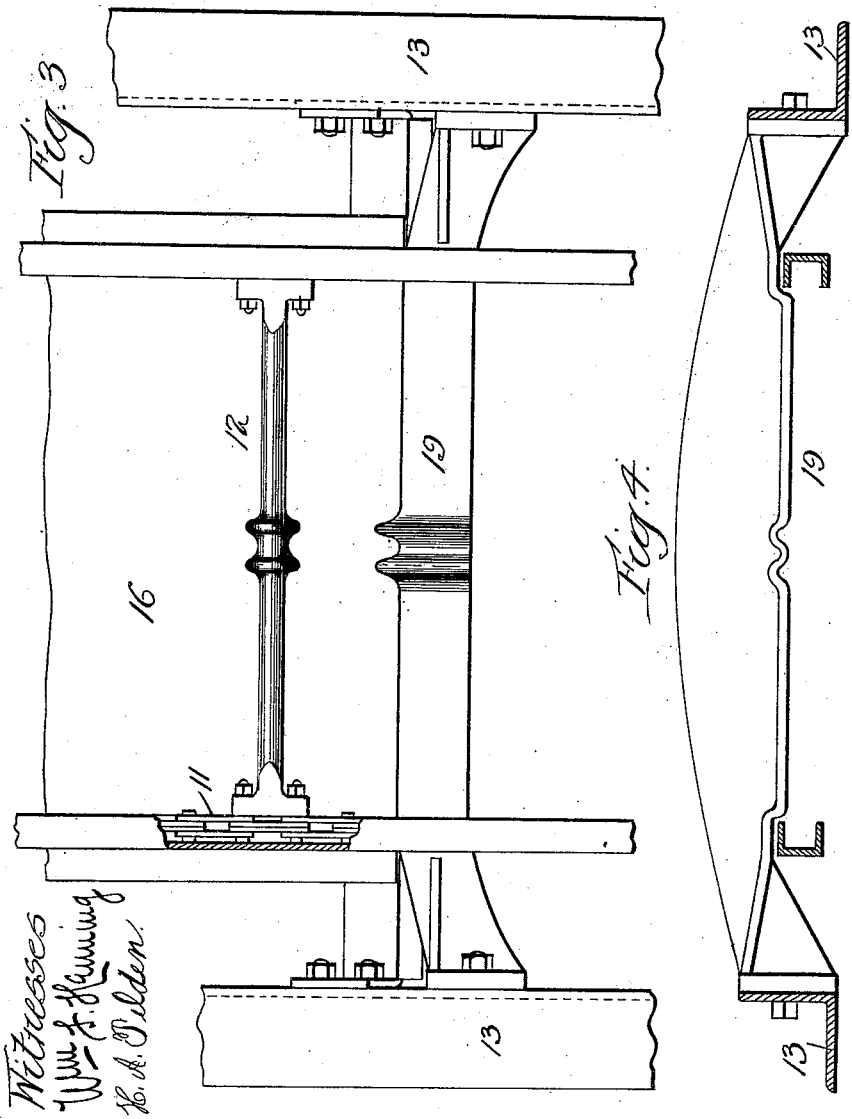

UNITED STATES PATENT OFFICE.

JOHN W. KOHLHEPP, OF CHICAGO, ILLINOIS, ASSIGNOR TO SWIFT AND COMPANY, OF CHICAGO, ILLINOIS, A CORPORATION OF ILLINOIS.

HOG-SCRAPING MACHINE.

SPECIFICATION forming part of Letters Patent No. 685,283, dated October 29, 1901.

Application filed June 4, 1897. Serial No. 639,418. (No model.)

*To all whom it may concern:*

Be it known that I, JOHN W. KOHLHEPP, a citizen of the United States, residing in Chicago, in the county of Cook and State of Illinois, have invented certain new and useful Improvements in Hog-Scraping Machines, of which the following is a specification.

My invention relates to hog-scraping machines, and particularly to machines of that class in which the hog is secured by a suitable hook to a moving carrier and is by it drawn through the scraping-machine and afterward automatically disengaged from the carrier and deposited at some convenient point. Carriers heretofore used for this purpose have usually been endless belts connected by suitable cross-bars, the cross-bars serving to receive the hooks by which the hogs are attached thereto.

Specifically stated, my invention resides in improved and simplified mechanism for automatically releasing the hooks from the cross-bars over which they are hooked, thereby permitting the hog, with the hook attached, to escape from the carrier.

In the accompanying drawings, Figure 1 is a side view of parts of the hog-scraping machine, part of the wall of the scraping-cylinder being broken away. Fig. 2 is a vertical section through the carrier, showing the releasing device. Fig. 3 is a front view of the parts shown in Fig. 2. Fig. 4 is a cross-section on line 4 4 of Fig. 2.

Referring to the drawings, 5 indicates a scraping-cylinder, which in the form herein shown is in two sections, one of said sections being arranged to be moved away from the other to permit of access to the interior thereof when desired, a hand-wheel 6, operating through rods 7 8 9, being provided for separating the sections of said cylinder.

10 indicates one of the scraper-arms.

11 indicates the endless belts which carry cross-bars 12, to which the hog-hooks are attached. As shown in Figs. 1 and 3, there are guides 13 14 to direct the course of the belts, the guides 14 being arranged at opposite sides of the cylinder 5, so that the carrier may move centrally through said cylinder. As shown in Fig. 1, the lower portion of the carrier extends substantially horizontally, and in practice the hog is hooked to the carrier near the lower portion thereof and is then carried up through the cylinder 5 and thence passes downward to a deflecting-plate 15, as shown in Fig. 1.

The apparatus above described is that commonly used heretofore, and I have not described it more fully because it does not constitute a part of my present invention, and I wish it to be distinctly understood that I do not restrict myself to the details of the construction illustrated.

16 indicates a stationary releasing-plate which is arranged at the side of the carrier opposite that at which the hook is attached and extends downward at an angle to the path of movement of the carrier, as shown in Figs. 1 and 2, and is in position to intercept the hog-hook at the proper point to release it from the cross-bar to which it is attached. In Fig. 2 one of the hog-hooks 17 is shown approaching the plate 16. As shown in Fig. 2, the hook 17 is provided with a lug 18, projecting in position to engage the plate 16 as the hook moves downward. The lower edge of the plate 16 terminates at such a point that as the cross-bars 12 move downward they will pass in close proximity thereto, consequently causing the hooks to be raised and thrown off such cross-bars as the carrier continues its downward movement. The releasing-plate 16 is also placed at such a height above the deflecting-plate 15 that the hog will be received upon said plate 15 as it is discharged from the carrier. A plate 19 extends across the frame of the machine immediately below and in juxtaposition to the plate 16, serving to reinforce such plate and insure the release of the hook.

While I have described my improvement as applied to hog-scrapers, I wish it to be understood that it may also be used for analogous purposes.

That which I claim as my invention, and desire to secure by Letters Patent, is—

1. In a hog-scraper, the combination with a carrier, of a hook for attaching the hog to said carrier, and a stationary releasing-plate inclined downwardly toward said carrier and having its inner portion extending across the path of descent of said hook, from the side opposite that at which the hook is carried, so that as the hook descends with the carrier, it will be struck by said plate and disengaged from the carrier, substantially as described.

2. In a hog-scraper the combination with a carrier, of a hook for attaching the object to be carried to said carrier, and having a lug extending laterally beyond the line of said carrier, a stationary inclined releasing-plate extending across the path of descent of said hook and a reinforcing-plate arranged immediately below and in juxtaposition to said stationary releasing-plate, whereby as the hook progresses with the carrier it will be disengaged therefrom by said releasing-plate, substantially as described.

JOHN W. KOHLHEPP.

Witnesses:
JOHN L. JACKSON,
ALBERT H. ADAMS.